(12) United States Patent
Ohazama

(10) Patent No.: US 6,545,678 B1
(45) Date of Patent: Apr. 8, 2003

(54) METHODS, SYSTEMS, AND COMPUTER PROGRAM PRODUCTS FOR GENERATING TISSUE SURFACES FROM VOLUMETRIC DATA THEREOF USING BOUNDARY TRACES

(75) Inventor: Chikai J. Ohazama, Sunnyvale, CA (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 09/186,792

(22) Filed: Nov. 5, 1998

(51) Int. Cl.[7] .............................................. G06T 15/20

(52) U.S. Cl. ........................ 345/427; 345/420; 345/421; 345/424; 345/581; 128/916; 382/154; 382/128; 382/131

(58) Field of Search ................................. 345/419, 420, 345/424, 581, 427, 421; 128/2, 660, 916; 382/154, 128, 131

(56) References Cited

U.S. PATENT DOCUMENTS

| 3,954,098 A | * | 5/1976 | Dick et al. ...................... 128/2 |
| 5,396,890 A | * | 3/1995 | Weng ........................... 128/660 |
| 5,889,524 A | * | 3/1999 | Sheehan et al. ............. 345/419 |
| 6,345,112 B1 | * | 2/2002 | Summers et al. ............ 382/128 |

OTHER PUBLICATIONS

Ota et al., "Novel Determination of Left Ventricular Volume by Tracing Arbitrary Planes Using Real–Time, 3D Echocardiography: In Vitro and In Vivo Validation," Clinical Cardiology, Supplement I, Abstract 1832.

Abbott et al., "Acoustic Speckle: Theory and Experimental Analysis," Ultrasonic Imaging 1, 1979, pp. 303–324.

Akima, "A Method of Bivariate Interpolation and Smooth Surface Fitting for Irregularly Distributed Data Points," ACM Transactions on Mathematical Software, vol. 4, No. 2, Jun. 1978, pp. 148–159.

Ch. 9 Representations of Three–Dimensional Structures—9.2.3—Surfaces That Are Functions on the Sphere, 9.3 —Generalized Cylinder Representation, 9.3.1—Generalized Cylinder Coordinate Systems and Properties, 9.3.2—Extracting Generalized Cylinders, 9.3.3—A Discrete Volumetric Version of the Skeleton, pp. 270–280.

Baan et al., "Continuous measurement of left ventricular volume in animals and humans by conductance catheter," Diagnostic Methods–Conductance Catheter, vol. 70, No. 5, Nov. 1984, pp. 812–823.

Belohlavek et al., "Three– and Four–Dimensional Cardiovascular Ultrasound Imaging: A New Era for Echocardiography," Mayo Clin Proc, vol. 68, Mar. 1993, pp. 221–240.

Bernstein et al., "Pulse sequence generated oblique magnetic resonance imaging: Applications to cardiac imaging," Med. Phys., vol. 13, No. 5, Sep./Oct. 1986, pp. 648–657.

(List continued on next page.)

Primary Examiner—Mark Zimmerman
Assistant Examiner—Kimbinh T. Nguyen
(74) Attorney, Agent, or Firm—Myers, Bigel, Sibley & Sajovec

(57) ABSTRACT

Tomographic images, including a tissue surface, are selected from volumetric data to provide selected tomographic images, each of the selected tomographic images has a respective orientation with respect to the tissue surface. Manual input data is accepted to define a boundary of the tissue surface in each of the selected tomographic images to provide respective manual traces of the boundary of the tissue surface. A 3D view of the tissue surface is displayed and updated in real time based on the manual traces of the boundary of the tissue surface. A user, such as a cardiologist, may therefore be provided with a visualization of the tissue surface allowing a faster and more accurate diagnosis of the tissue condition.

49 Claims, 13 Drawing Sheets

OTHER PUBLICATIONS

Breburda et al., "Comparison of Three–Dimensional Echo and Proximal Flow Convergence Method for Quantification of Mitral Regurgitation," Abstract No. 730–5, Abstracts—Oral, JACC, Feb. 1997, p. 174A.

Brevdo et al., "A Simple Approach to the Problem of 3–D Reconstruction," Computer Vision, Graphics, and Image Processing, vol. 37, 1987, pp. 420–427.

Buckey et al., "Right and Left Ventricular Volumes In Vitro by a New Nongeometric Method," American Journal of Cardiac Imaging, vol. 1, No. 3, Jul. 1987, pp. 227–233.

Burckhardt, "Speckle in Ultrasound B–Mode Scans," IEEE Transactions on Sonics and Ultrasonics, vol. SU–25, No. 1, Jan. 1978, pp. 1–6.

"6.4.1 Mechanical Scanners," 6/Diagnostic Imaging Configurations, pp. 144–146.

Cranney et al., "Left Ventricular Volume Measurement Using Cardiac Axis Nuclear Magnetic Resonance Imaging," Left Ventricular Volumes By NMR, vol. 82, No. 1, Jul. 1990, pp. 154–163.

Edelsbrunner et al., "Three–Dimensional Alpha Shapes," ACM Transactions on Graphics, vol. 13, No. 1, Jan. 1994, pp. 43–72.

16.3 Surface Detail, 16.3.1 Surface–Detail Polygons, 16.3.2—Texture Mapping, pp. 741–744.

Gawne et al., "Estimating left ventricular offset volume using dual–frequency conductance catheters," Offset Volume from Dual Frequencies, pp. 872–876.

Geiser et al., "A Mechanical Arm for Spatial Registration of Two–Dimensional Echocardiographic Sections," Catheterization and Cardiovascular Diagnosis, vol. 8, 1982, pp. 89–101.

Greenleaf et al., "Multidimensional Visualization in Echocardiography: An Introduction," Mayo Clin Proc, vol. 68, Mar. 1993, pp. 213–220.

Hayashi et al., "Measurement of Left Ventricular Volume by Dual–Field Conductance Catheter in Humans—Comparison With Single–Field Conductance Catheter," Japanese Circulation Journal, vol. 60, Feb. 1996, pp. 85–95.

Hoppe et al., "Surface Reconstruction from Unorganized Points," Computer Graphics, vol. 26, No. 2, Jul. 1992, pp. 71–78.

Jensen et al., "Field: A Program for Simulating Ultrasound Systems," Medical & Biological Engineering & Computer, vol. 34, Supplement 1, Part 1, 1996, pp. 351–352.

King, et al., "Three–dimensional Echocardiography, Advances for Measurement of Ventricular Volume and Mass," Supplement I, Hypertension, vol. 23, No. 1, Jan. 1994, pp. I–172–I–179.

King et al., "Three–Dimensional Spatial Registration and Interactive Display of Position and Orientation of RealTime Ultrasound Images," J Ultrasound Med, vol. 9, 1990, pp. 525–532.

Lin et al., "Three–Dimensional Reconstruction of LV Endocardial Surfaces from Echocardiographic Images Using Deformable Shell Models," Computers in Cardiology, 1996, pp. 697–700.

Lorensen, "Marching Cubes: A High Resolution 3D Surface Construction Algorithm," Computer Graphics, vol. 21, No. 4, Jul. 1987, pp. 163–169.

Mathru et al., "Measurement of Right Ventricular Volume in Human Explanted Hearts Using Ultrafast Cine Computer Tomography," Chest, vol. 105, No. 2, Feb. 1994, pp. 585–588.

McCann et al., "Multidimensional Ultrasonic Imaging for Cardiology," Proceedings of the IEEE, vol. 76, No. 9, Sep. 1988, pp. 1064–1073.

Mochizuki et al., "Assessment of Left Ventricular Volume Using ECG–Grated SPECT with Technetium–99m–MIBI and Technetium–99m–Tetrofosmin," The Journal of Nuclear Medicine, vol. 38, No. 1, Jan. 1997, pp. 53–57.

Nelson et al., "Visualization of 3D Ultrasound Data," IEEE Computer Graphics & Applications, Nov. 1993, pp. 50–57.

Ohazama et al., A New, Rapid Visualization Method for Detection of Ischemic Risk Volume by Three–Dimensional Echocardiography, Abstract No. 1072-27, Abstracts—Poster, JACC, Feb. 1997, p. 479A.

Pentland et al., "Closed–Form Solutions for Physically Based Shape Modeling and Recognition," IEEE Transactions on Pattern Analysis and Machine Intelligence, vol. 13, No. 7, Jul. 1991, pp. 715–729.

Pietras et al., "Validation of Ultrafast Computed Tomographic Left Ventricular Volume Measurement," Investigated Radiology, vol. 26, No. 1, Jan. 1991, pp. 28–33.

Poli et al., "Recovery of 3D Closed Surfaces from Sparse Data," CVGIP: Image Understanding, vol. 60, No. 1, Jul. 1994, pp. 1–25.

Sakas et al., "Extracting Surfaces from Fuzzy 3D–Ultrasound Data," Computer Graphics Proceedings, Annual Conference Series, 1995, pp. 465–474.

Sapin et al., "Comparison of Two– and Three–Dimensional Echocardiography with Cineventriculography for Measurement of Left Ventricular Volume in Patients," JACC vol. 24, No. 4, Oct. 1994, pp. 1954–1063.

Sapin et al., "Three–Dimensional Echocardiographic Measurement of Left Ventricular Volume In Vitro: Comparison With Two–Dimensional Echocardiography and Cineventriculography," JACC vol. 22, No. 5, Nov. 1, 1993, pp. 1530–1537.

Smith et al., "High–Speed Ultrasound Volumetric Imaging System–Part I: Transducer Design and Beam Steering," IEEE Transactions on Ultrasonics, Ferroelectrics, and Frequency Control, vol. 38, No. 2, Mar. 1991, pp. 100–108.

Somer, "Electronic sector scanning for ultrasonic diagnosis," Ultrasonics, Jul. 1968, pp. 153–159.

Staib, "Model–Based Deformable Surface Finding for Medical Images," IEEE Transactions on Medical Imaging, vol. 15, No. 5, Oct. 1996, pp. 720–731.

Stetten et al., "5.2 Swath Algorithm for Shape Detection in Matrix Array Ultrasound," Program and Abstracts, $21^{st}$ International Symposium on Ultrasonic Imaging and Tissue Characterization, Jun. 3–5, 1996, Rosslyn Westpark Hotel, Arlington, VA, Ultrasonic Imaging, vol. 18, Article No. 0004, 1995, p. 55.

Szeliski, "Fast Surface Interpolation Using Hierarchical Basis Functions," IEEE Transactions on Pattern Analysis and Machine Intelligence, vol. 12, No. 6, Jun. 1990, pp. 513–528.

Terzopoulos, "Dynamic 3D Models with Local and Global Deformations: Deformable Superquadrics," IEEE Transactions on Pattern Analysis and Machine Intelligence, vol. 13, No. 7, Jul. 1991, pp. 703–714.

Underwood et al., "Left ventricular volume measured rapidly by oblique magnetic resonance imaging," Br Heart J, vol. 60, 1988, pp. 188–195.

von Ramm et al., "High–Speed Ultrasound Volumetric Imaging System–Part II: Parallel Processing and Image Display," IEEE Transactions on Ultrasonics, Ferroelectrics, and Frequency Control, vol. 38, No. 2, Mar. 1991, pp. 109–115.

von Ramm et al., "Cardiac Imaging Using a Phased Array Ultrasound System, I. System Design," Cardiac Imaging I, vol. 53, No. 2, Feb. 1976, pp. 258–262.

Wynne et al., "Estimation of Left Ventricular Volumes in Man from Biplane Cineangiograms Filmed in Oblique Projections," The American Journal of Cardiology, vol. 41, Apr. 1978, pp. 726–732.

Zoghbi et al., "Determination of Left Ventricular Volumes With Use of a New Nongeometric Echocardiographic Method: Clinical Validation and Potential Application," JACC, vol. 15, No. 3, Mar. 1, 1990, pp. 610–617.

* cited by examiner

METHODS, SYSTEMS, AND COMPUTER PROGRAM PRODUCTS FOR GENERATING TISSUE SURFACES FROM VOLUMETRIC DATA THEREOF USING BOUNDARY TRACES

This invention was made with Government support under grant number CDR-8622201 from The National Science Foundation. The Government has certain rights to this invention.

FIELD OF THE INVENTION

The present invention relates to the field of imaging in general and more particularly to the imaging of tissue surfaces using volumetric data.

BACKGROUND OF THE INVENTION

Heart disease is one of the leading causes of death in the United States. An important part of diagnosing heart disease may be assessing the mechanical function of the heart. In particular, quantitative measurement of a patient's heart, including the left ventricle, may provide a basis upon which a diagnosis can be made. For example, ejection fraction, which may involve a determination of a left ventricle surface and/or volume, may be used as an indicator of a heart condition.

One method to quantitatively measure heart anatomy is to acquire moving pictures of the heart. This method may provide visualization of the heart walls and quantitative measures of the heart volume and/or surface through planimetry or other means. Volumetric measurement of the left ventricle has been done using techniques such as conductance catheters and cineangiography. Conductance catheters can measure volumes using the conductance of blood, which is proportional to the blood volume, but its accuracy may be dependent on the measurement of an offset term. Moreover, the use of catheters is an invasive technique, which can induce arrhythmia in the patient.

Volume measurements using Cineangiography may be calculated from Two-Dimensional (2D) projections of the left ventricle which may induce errors in the volume measurements. The projection error may be particularly problematic when analyzing aneurysmic hearts.

Computerized Tomography (CT) and Magnetic Resonance Imaging (MRI) have been used to analyze the heart, providing volumetric data of the left ventricle of the heart. Measurements may then be made using the volumetric data. Cardiac and respiratory gating, however, may be required due to the long acquisition times associated with CT and MRI. In particular, the acquisition time for CT and MRI volume data may span several heart beats, thereby making analysis of the heart function more difficult. Furthermore, gated CT and MRI systems may generate average quantitative measurements which may adversely affect the images and the measurements. In particular, averaging may cause spatial misregistration in the image particularly in the presence of an arrhythmia. Consequently, CT and MRI systems may not allow a functional assessment of the heart between beats.

One method of calculating the volume of a left ventricle from volumetric data is by manually tracing the endocardial border of the left ventricle of the heart in a plurality of images from a set of short axis tomographs or slices of the heart. In particular, a cardiologist may manually trace a parallel set of tomographic images of the left ventricle that include the endocardial border. A thickness may be assigned to each of the respective slices and an area of the endocardial boundary for each slice is estimated using the manual tracing for that slice. The area and thickness for each slice are used to calculate a portion of the ventricular volume represented by respective slice, and all of the respective volumes may then be summed to provide an estimated left ventricle volume.

Automatic Border Detection (ABD) may be used in some situations to automatically trace the endocardial border. Some ABD methods may treat the ventricular surface as a stack of contours and apply border detection in only two dimensions. Other methods may treat the ventricular surface as a parameterized representation. In both methods, one of the goals is to optimize the contour or maximize the boundary strength, which may be defined by the local gradient in the image. Automatic boundary tracing using these two types of ABD has been partially successful, but may not perform well on volumetric ultrasound data. In particular, ultrasound data may be noisy, have relatively low resolution, and exhibit drop out due to shadowing or poorly aligned surfaces, and therefore may be difficult to accurately process using ABD.

The tracing of the endocardial boundary may allow the generation of a surface that corresponds to the left ventricle of the heart. Primarily, triangulation and surface optimization have been used for the generation of a Three-Dimensional (3D) surface from a set of points. These techniques, however, may be computationally intensive.

Other surface reconstruction methods use a spherical surface representation and $4^{th}$ order polynomials to interpolate the surface by triangulating a set of points local to the point of interest. This method may require a well-sampled surface or an irregular sampling structure for adequate reconstruction. Moreover, circular or line ordered samples could cause unwanted artifacts in the interpolation.

As described above, conventional methods of detecting the endocardial boundary of the left ventricle may be slow and prone to errors or may not perform well using volumetric ultrasound data. Furthermore, conventional methods of surface reconstruction of the left ventricle may be computationally intensive or require a well sampled surface to perform well. Consequently, there continues to be a need for improved methods, systems, and computer program products to provide images of tissue surfaces using volumetric data.

SUMMARY OF THE INVENTION

It is therefore an object of the present invention to provide improved imaging of tissue surfaces.

It is another object of the present invention to allow a reduction in the time required to generate a 3D view of the surface of a tissue.

It is another object of the present invention to provide improved methods, systems, and computer program products for generating images of a surface of the left ventricle of the heart.

These and other objects are provided by accepting manual traces of boundaries of a tissue in selected tomographic images from a user. A tissue surface is reconstructed based on the input from the user. The user selects tomographic images and traces the tissue boundaries therein to further define the reconstructed surface.

In one aspect of the present invention, an initial estimate of the tissue surface is provided using a predetermined shape and modifying the shape as the boundaries are traced, thereby further refining a 3D view of the tissue surface. For example, a cylindrical shape may be used when generating a 3D view of left ventricle of the heart. The generation of the 3D view of the tissue surface is accomplished through the use of computer graphics technology.

In particular, a plurality of tomographic images including the tissue surface are selected from volumetric data to provide a plurality of selected tomographic images, each of the selected tomographic images having a different orientation with respect to the tissue surface. Manual input of data is accepted to define a boundary of the tissue surface in each of the selected tomographic images to provide respective manual traces of the boundary of the tissue surface. A 3D view of the tissue surface is generated based on the manual traces of the boundary of the tissue surface. The volumetric data may be 3D data generated by an imaging modality, such as ultrasound, CT, or MRI, or stored in a medium for analysis at a later time, such as an optical disk.

In another aspect of the present invention, a composite image is displayed. The composite image includes a 3D view of the tissue surface and a selected tomographic image including the tissue surface from the volumetric data. The 3D view is generated using the manual traces of the boundary of the tissue surface in each of a plurality of the selected tomographic images. Displaying the 3D view in conjunction with a tomographic image may orient the user with respect to the tissue surface being viewed, thereby allowing more efficient reconstruction of the tissue surface by the user.

In another aspect of the present invention, new tomographic images are selected by traversing the rendered view of the tissue surface using a sweep and a turn position. Manual input-data is accepted to define a boundary of the tissue surface in a new tomographic image to provide a manual trace thereof. The rendered view of the tissue surface is updated in real time based on the manual traces of the boundary of the tissue surface including the manual trace of the boundary of the tissue surface in the new tomographic image. The traversal of the rendered view using the sweep and turn position may allow a more efficient method of selecting tomographic images to further refine the tissue surface.

The selected tomographic image may be displayed embedded in the rendered view according to the orientation of the tomographic image. Embedding the tomographic image in the rendered view may provide a more convenient method of visualizing relationships between the selected tomography, and the rendered view, thereby allowing a reduction in the time required to reconstruct the tissue surface.

In another aspect of the present invention, geometric data is generated that corresponds to an unsampled portion of the left ventricle of the heart based on volumetric data that corresponds to a sampled portion of the left ventricle of the heart and a cylindrical coordinate system. A ventricular surface is generated based on the geometric data that corresponds to the unsampled portion of the left ventricle of the heart and the volumetric data that corresponds to the sampled portion of the left ventricle of the heart.

The generation of the geometric data may allow a reduction in the time required to update the rendered view of the tissue surface in real time based on the manual traces.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is described herein in relation to the generation of images of the left ventricle of the heart. However, the present invention may be used to image other types of tissue. In addition, the present invention is described with reference to an ultrasound modality. It will be understood, however, that the scope of the present invention includes the use of other modalities such as MRI and CT. As will be understood by one having skill in the art, the components of the systems described herein may be packaged as a single unit or packaged separately and interconnected to provide the functions described herein.

The present invention may allow a user, such as a cardiologist, to generate a 3D model of the left ventricle of the heart more quickly and more accurately than in the prior art. According to the present invention, the 3D model of the left ventricle is generated from manual traces of the endocardial boundary as shown in tomographic images of the left ventricle. Each manual trace is created by tracing the endocardial boundary in a respective tomographic image of the left ventricle.

The tomographic images that include the endocardial boundaries are selected by the cardiologist according to an orientation of the tomographic images with respect to the surface of the left ventricle. Accordingly, the cardiologist selects tomographic images of the left ventricle and traces the endocardial boundaries included therein, whereupon a 3D view of the left ventricle is generated. As the cardiologist selects additional tomographic images and traces the respective endocardial boundaries therein, the 3D model and 3D view of the left ventricle are further defined.

Figure 1:
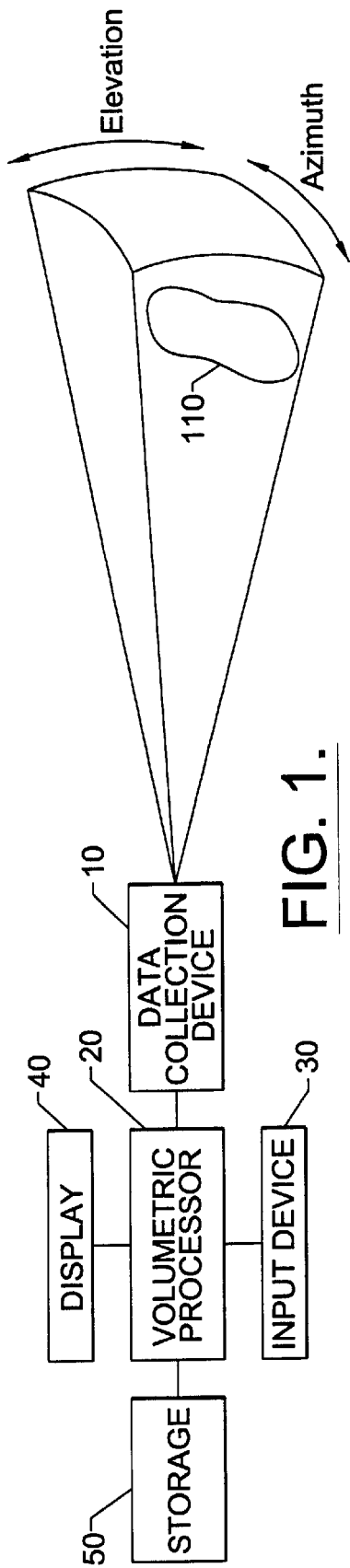
FIG. 1 is a block diagram of a volumetric processing system that generates images of the left ventricle.

FIG. 1 is a block diagram of a volumetric processing system used to scan a left ventricle of a heart 110 in elevation and azimuth to provide volumetric ultrasound data according to the present invention. In particular, a data collection device 10 transmits ultrasound energy into a body and receives corresponding reflected ultrasound energy from the left ventricle 110 and surrounding tissue. The ultrasound energy is focused to define a beam that is steered in elevation and azimuth over the desired volume using beam steering techniques known to those having skill in the art. Alternately, a storage device 50, such as from an optical disk, a hard disk, a CD-ROM, a magnetic storage device, or an electronic storage device, can provide volumetric ultrasound data offline.

The reflected ultrasound energy is processed by a volumetric processor 20 to provide volumetric ultrasound data that corresponds to the scanned volume. The volumetric processor 20 generates tomographic images of the left ventricle 110 and a 3D view of the left ventricle 110 from the volumetric data. The volumetric processor 20 may be a volumetric ultrasound machine, a volumetric processor upgrade to a conventional 2D ultrasound machine, a general purpose computer, or combinations thereof.

The 3D view of the left ventricle is a rendering of volumetric data on a two-dimensional (2D) display 40. The display may be a Cathode Ray Tube (CRT), Liquid Crystal Display (LCD) or other display known to those having skill in the art.

The user selects a plurality of tomographic images including the left ventricle from the volumetric data using an input device 30. Each of the selected tomographic images has an orientation with respect to the left ventricle that also may be specified using the input device 30. The user traces the endocardial boundaries shown in the tomographic images displayed on the display 40 using the input device 30.

The volumetric processor 20 processes the manual traces of each of the boundaries in the plurality of tomographic images to create the 3D view of the left ventricle. Moreover, the volumetric processor 20 updates the 3D view of the left ventricle in real time as additional endocardial boundaries are traced using the input device 30.

The volumetric processor 20 will now be described in greater detail. As described above, the volumetric processor 20 provides the volumetric ultrasound data by processing the reflected ultrasound data. In particular, the volumetric processor 20 converts a Polar scan format of the reflected ultrasound energy to a Cartesian scan format so that the user may select tomographic images therefrom.

Figure 2:
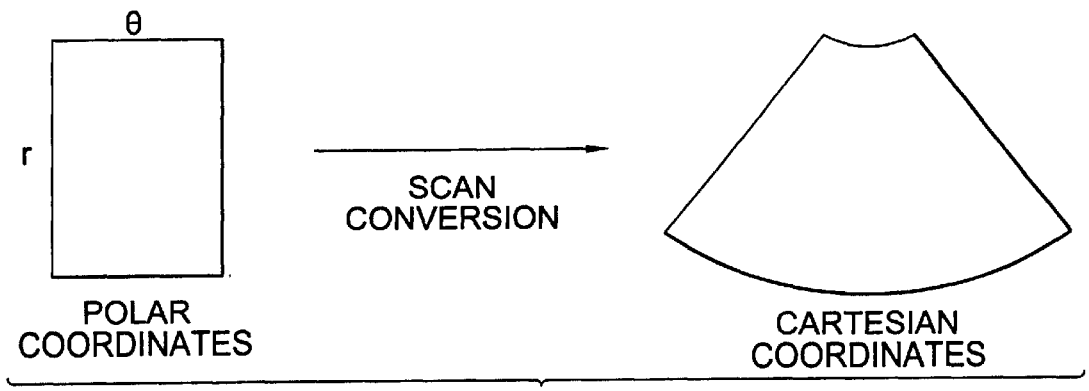
FIG. 2 illustrates a scan conversion of two-dimensional Polar coordinates to two-dimensional Cartesian coordinates.

FIG. 2 illustrates a scan conversion of 2D Polar coordinates to 2D Cartesian coordinates according to the present invention. Texture-mapping generally comprises pasting an image onto a polygon mesh. The polygonal mesh upon which the images are texture-mapped can be of any shape. 3D texture-mapping is an extension of the 2D texture-mapping process into a third-dimension.

Figure 3:
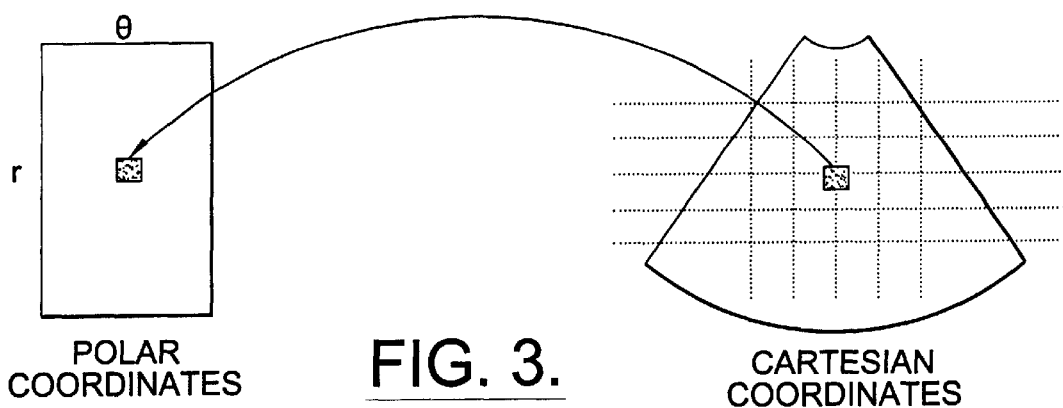
FIG. 3 illustrates a two dimensional texture-map scan conversion from Polar to Cartesian coordinates according to a first embodiment of the present invention.

FIG. 3 illustrates a 2D texture-map scan conversion from Polar to Cartesian coordinates according to a first embodiment of the present invention. Although FIG. 3 illustrates a 2D texture-map scan conversion, a 3D texture-map scan conversion is within the scope of the present invention. In a first embodiment, the corresponding position of each of the points in the Cartesian coordinate domain is mapped to the Polar coordinate domain. The value of each point in the image is then calculated in the Polar coordinate domain.

Figure 4:
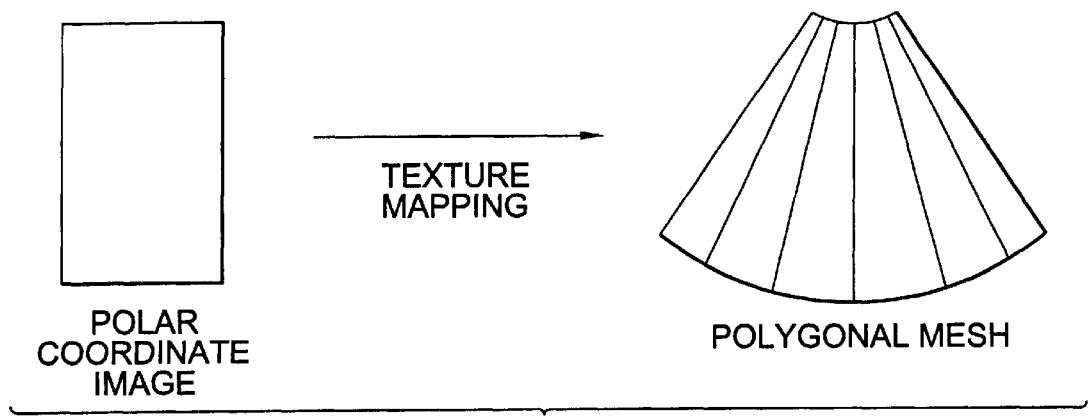
FIG. 4 illustrates a texture-map scan conversion from Polar to Cartesian coordinates according to a preferred embodiment of the present invention.

FIG. 4 illustrates a texture-map scan conversion from Polar to Cartesian coordinates according to a preferred embodiment of the present invention. In a preferred embodiment, the Polar coordinate image is mapped onto a polygonal mesh that is in the form of a sector. Moreover, the scan conversion is simplified due to the linear transitions along the radial dimension in both coordinate systems. Consequently, tessellation need only be done in the angular dimension.

Figure 5:
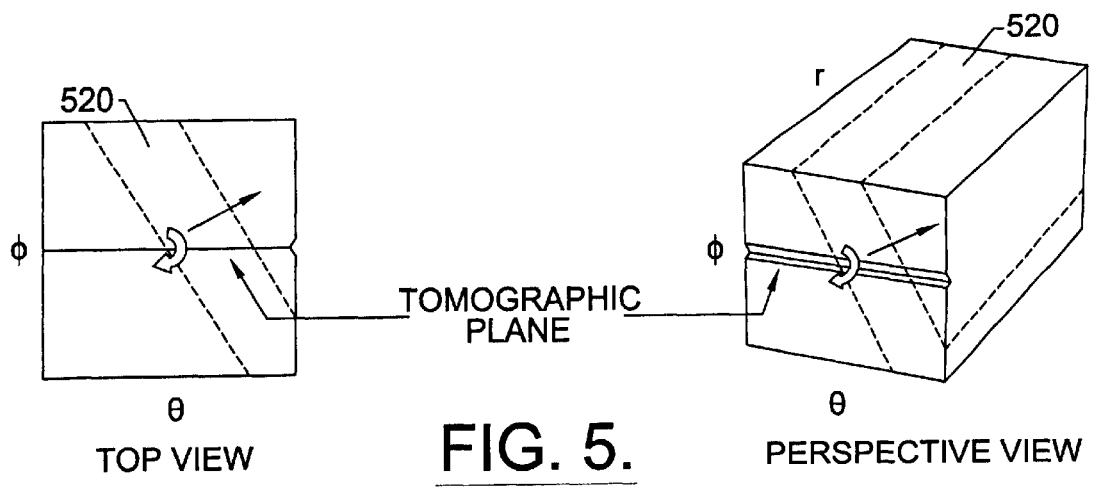
FIG. 5 illustrates top and perspective views of a slice through scan converted volumetric data as illustrated in FIG. 4.

The scan conversions described above provide the volumetric ultrasound data from which the user selects the tomographic images that include the endocardial boundaries. FIG. 5 illustrates top and perspective views of a slice through scan converted volumetric data as illustrated in FIG. 4. As shown in FIG. 5, the 2D scan conversion provides volumetric data, wherein the Polar coordinate image is a slice 520 through the volumetric data in azimuth-elevation coordinate space oriented along the radial dimension. The slice 520 can be selected by changing the orientation of the slice 520 in the $\theta$ and $\phi$ dimensions and rotation about the radial dimension. The volumetric processor 20 may generate the tomographic image based on the slice 520. Thus, the volumetric data may be traversed to provide a selected tomographic image having a desired orientation.

Figure 6A:
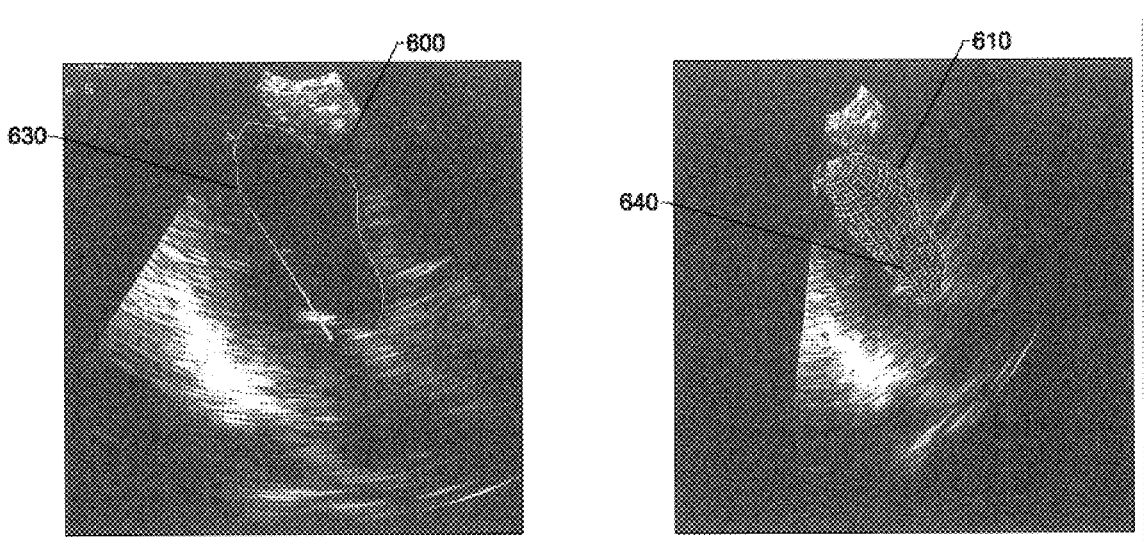
FIGS. 6A–6C illustrate tracing an endocardial boundary in a selected tomographic image.
Figure 6B:
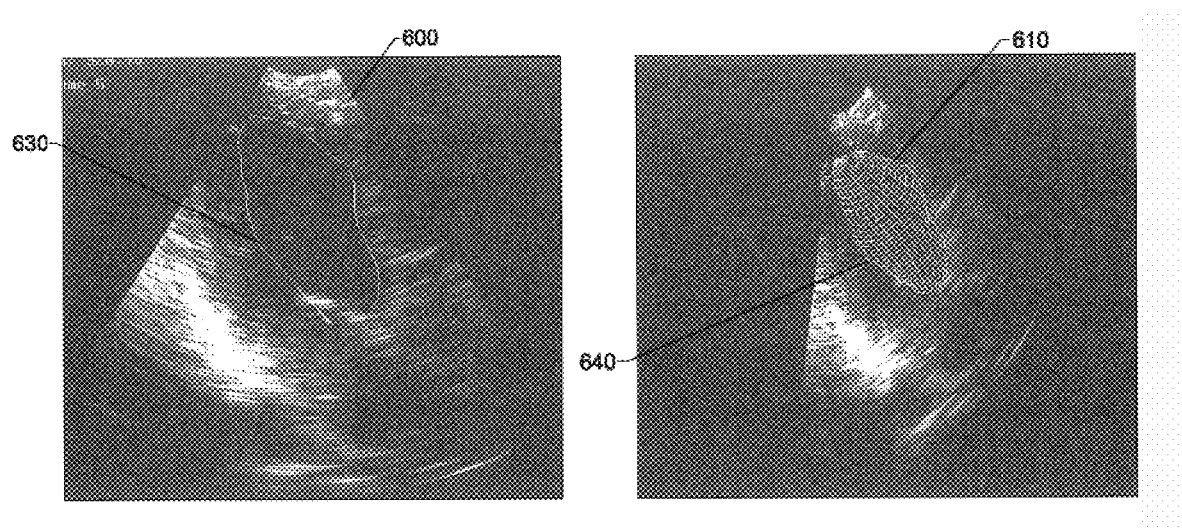
Figure 6C:
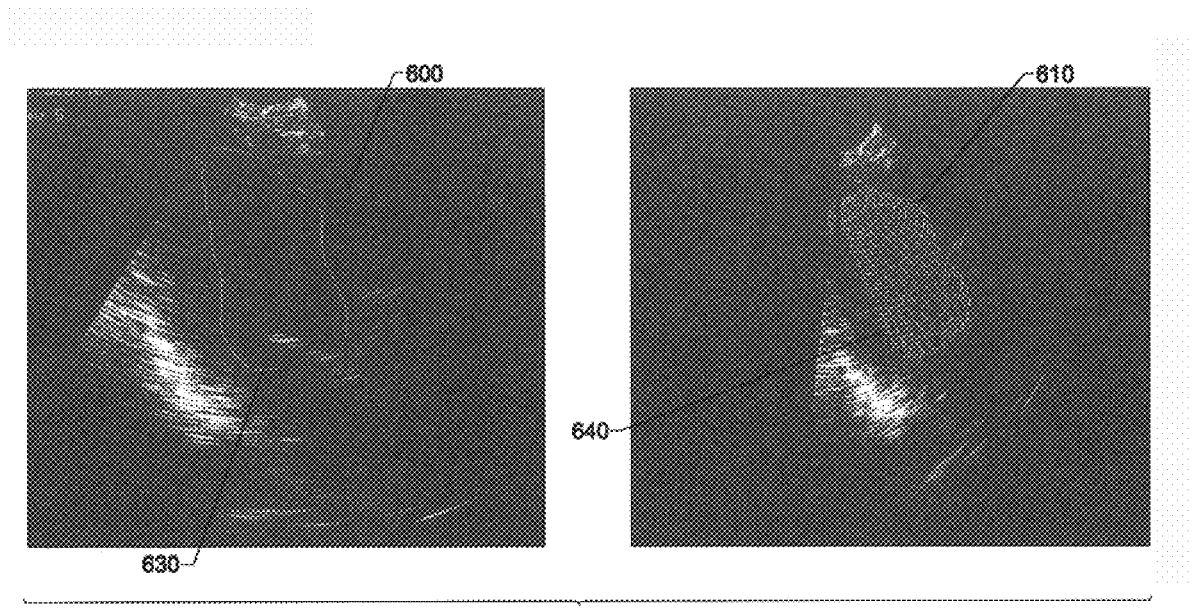

FIGS. 6A–6C illustrate tracing an endocardial boundary in a selected tomographic image. In particular, a 3D view 610 of the left ventricle of the heart, described herein, can be generated by manually tracing the endocardial boundary 630 in a plurality of selected tomographic images 600.

According to FIG. 6A, a tomographic image 600 is selected from the volumetric ultrasound data. The user manually traces the endocardial boundary 630 of the left ventricle in the selected tomographic image 600 to provide a manual trace boundary. As shown in FIG. 6B and FIG. 6C, as the user traces more of the endocardial boundary 630 in the selected tomographic image 600, the corresponding portion 640 of the 3D view 610 is further refined. For example, as the user traces the endocardial boundary 630, detail is added to the mesh structure at the corresponding portion 640 of the 3D view 610.

The user traces the endocardial boundary 630 in the selected tomographic images 600 using the input device 40. The input device 40 can be a mouse, control knob, joy stick, trackball, keyboard, light pen or combinations thereof. For example, the user may select the tomographic images 600 using a control knob to provide the orientation of the tomographic image and a light pen to trace the endocardial boundaries of the left ventricle on the display 40.

Study of the boundary localization error due to resolution limits of ultrasound has shown that there may be a slight overestimation in volume of the left ventricle if the tracing is done improperly. This can be expected since a positive surface error will result in a larger volume differential than with a negative surface error. However, this effect may be dominated by a consistent underestimation of the volume caused by tracing the endocardial boundary at the perceived boundary location, which coincides with the start of the boundary transition. Consequently, the boundary localization error can be addressed by tracing the boundary at the middle of the transition or by adding a correction factor to each point on the reconstructed surface.

Figure 7A:
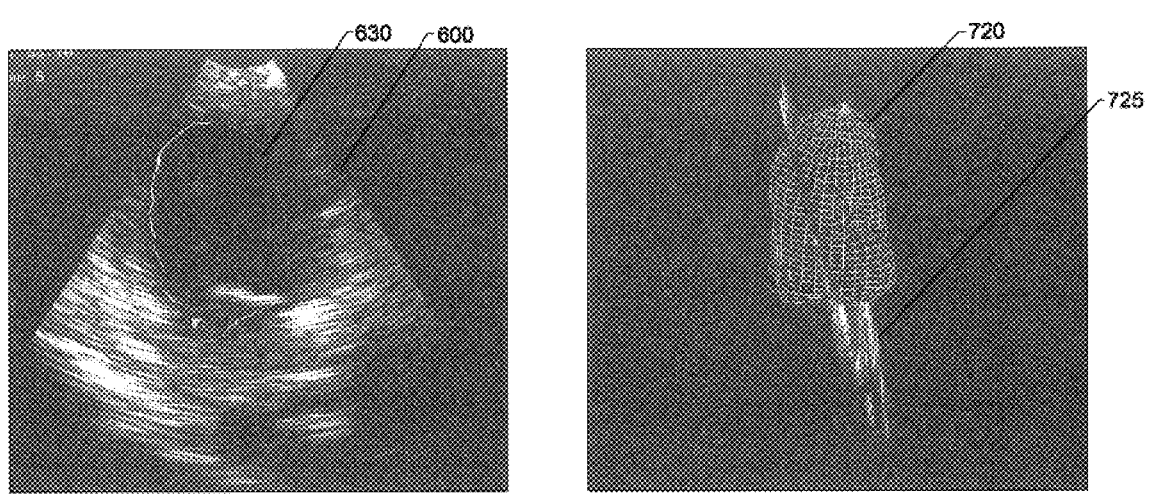
FIGS. 7A–7C illustrate a generation of a composite image of the left ventricle of the heart by manually tracing endocardial boundaries in a plurality of selected tomographic images.
Figure 7B:
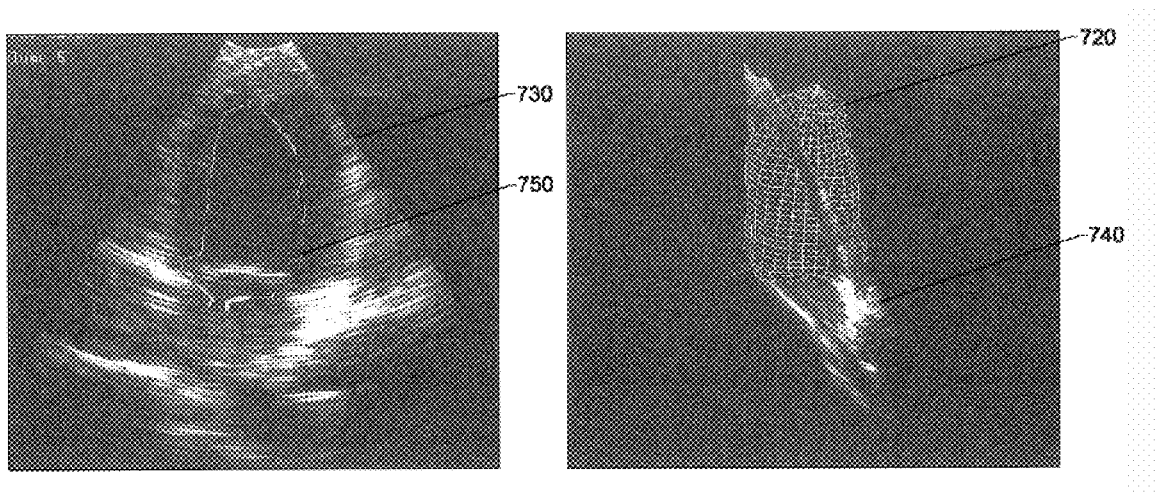
Figure 7C:
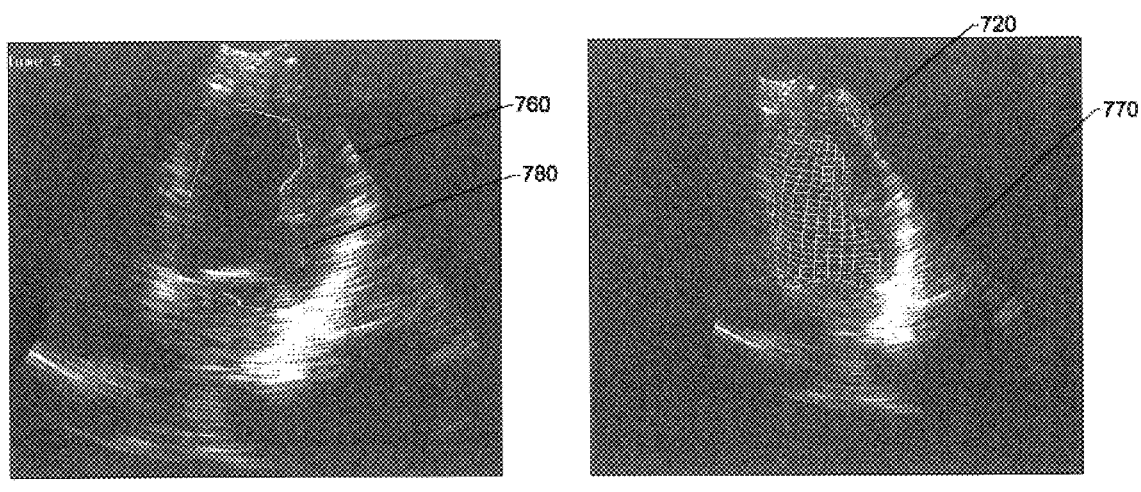
Figure 8:
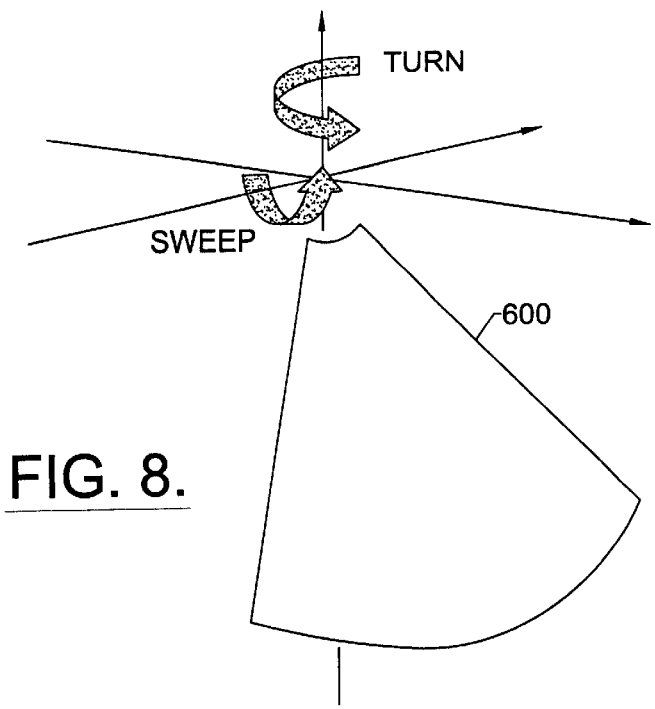
FIG. 8 illustrates an orientation of the selected tomographic image including a sweep position and a turn position.

FIGS. 7A–7C illustrate a generation of a composite image of the left ventricle of the heart by manually tracing endocardial boundaries in a plurality of selected tomographic images. According to FIG. 7A, a 2D rendering of a 3D surface of the left ventricle, or 3D view 720, is generated based on the manual trace boundaries. The composite image includes a 2D slice 725 embedded in the 3D view 720 of the left ventricle of the heart with the orientation illustrated. The orientation of the selected tomographic image 600 includes a sweep position and a turn position as shown in FIG. 8. The 2D slice 725 represents the selected tomographic image 600 in which the user traces the endocardial boundary 630.

The 3D view 720 is initially set to a cylindrical shape to approximate the surface of the left ventricle. As new tomographic images are selected and the respective endocardial boundaries are manually traced, the initial cylindrical shape of the 3D view 720 is deformed to further define the 3D view 720 to approximate the surface of the left ventricle.

According to FIG. 7B, the user traverses the 3D view 720 and selects a first new tomographic image 730 having a new orientation with respect to the surface of the left ventricle. A slice 740 that corresponds to the first new tomographic image 730 is displayed and the user traces the endocardial boundary 750 included therein. Accordingly, the 3D view 720 is updated based on the manual trace of the endocardial boundary 750.

According to FIG. 7C, the user traverses the 3D view 720 and selects a second new tomographic image 760 having a new orientation with respect to the surface of the left ventricle. A slice 770 that corresponds to the second newly selected tomographic image 760 is displayed and the user traces the endocardial boundary 780 included therein. Accordingly, the 3D view 720 is updated using the manual trace of the endocardial boundary 780.

As described above, the 3D view 720 of the left ventricle may be generated based on manual traces of the endocardial boundaries in the selected tomographic images of the left ventricle. In particular, the 3D view 720 may be generated by tracing or sampling only a portion of the volumetric ultrasound data that corresponds to the left ventricle. In other words, only a portion of all of the tomographic images available may need be manually traced to generate the 3D view 720. According to the present invention, the volumetric processor 20 then generates the unsampled portion of the left ventricle based on the sampled portion of the left ventricle described above and updates the 3D view 720.

According to simulations, a system utilizing the present invention may generate a 3D view of the left ventricular surface within the expected surface error limit, set by the resolution limits of ultrasound, with a 25% sampling (approximately 4–5 traces) of the surface using a line sampling structure. This may be attributed partly to the incorporation of geometric characteristics of the left ventricle into the reconstruction method, but also to the generally smooth surface of the left ventricle. Since sampling can be done in a non-uniform manner, the surface can be sampled more in areas with deformations, and less in areas which are well approximated by the present invention.

Generating a 3D View of the Left Ventricle of the Heart

As described above, the 3D view 720 of the surface of the left ventricle may be generated by selecting a number of tomographic images and manually tracing the endocardial boundaries included therein. The number of selected tomographic images represents a sampled portion of the left ventricle of the heart. According to the present invention, the 3D view 720 is generated based on the sampled portion of the left ventricle of the heart and geometric data that corresponds to an unsampled portion of the left ventricle of the heart.

Figure 9:
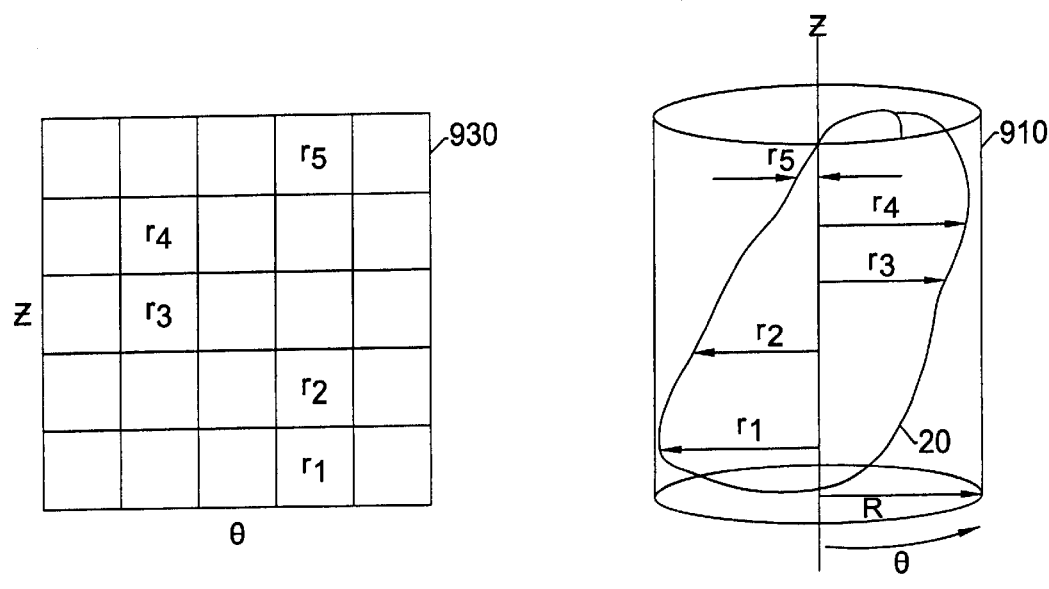
FIG. 9 illustrates a left ventricle of the heart represented as a simplified raster map according to the present invention.

FIG. 9 illustrates a left ventricle of the heart represented as a raster map according to the present invention. According to FIG. 9, a cylindrical surface 910 is used to initially represent the surface of the left ventricle 920. The cylindrical surface 910 is described using the coordinates R, θ, and z. The cylindrical surface is used because of its similarity to the general shape of the left ventricle of the heart.

A discrete 2D representation or raster map 930 of the surface is generated by projecting the left ventricle 920 onto the cylinder 910. The resulting raster map 930 contains the exemplary radial distances, r1–r5, from the z axis of the cylindrical surface 910 for a given angle θ and height z. Storing the volumetric data in the raster map 930 may provide a context within which point-to-point comparisons between two surfaces and the quantification of specific aspects of a surface can be performed. For example, the raster map may be used to compare the surface of the left ventricle under evaluation with data from a normalized left ventricle.

As described above, the raster map 930 includes the radial distance, R, from the center z axis of the cylindrical surface 910 to the surface of the left ventricle 920 at a corresponding angle θ and height z. For example, as shown in FIG. 9, the raster map 930 comprises z rows and θ columns. The rows and columns correspond to the same coordinates use to describe the cylindrical surface 910. Accordingly, the radial distance r1 is stored in the raster map 930 in a location that corresponds to the z row and θ column that identify the position on the surface of the left ventricle 920. Furthermore, the radial distances r1–r5 are generated by the manual trace of the endocardial boundaries in the selected tomographic images. Radial distances r2–r5 are stored in the raster map according to the same technique applied to r1.

Figure 10:
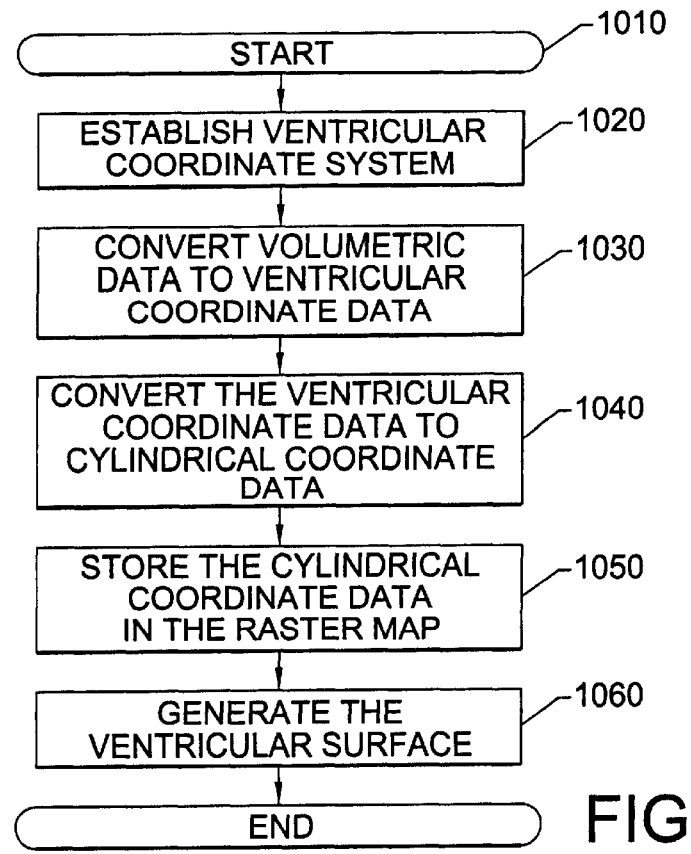
FIG. 10 is a flowchart illustrating operations used to generate a 3D view of a left ventricle of a heart according to the present invention.
Figure 11:
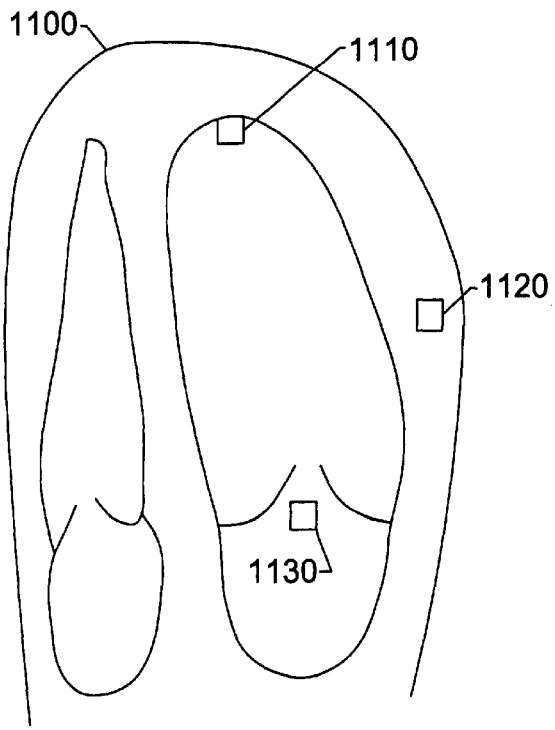
FIG. 11 illustrates the creation of a cylindrical coordinate system based on points taken from volumetric data that corresponds to a left ventricle of a heart.

FIG. 10 is a flowchart illustrating methods of generating the 3D view of the left ventricle according to the present invention. According to FIG. 10, processing starts at Block 1010. A ventricular coordinate system is established by selecting an apex 1110, base 1130, and lateral wall points 1120 of the left ventricle 1100 in the volumetric data (Block 1020) as shown in FIG. 11. The base point 1130 establishes the origin of the coordinate system. The apex 1110 establishes the direction of the z axis and the scale of the coordinate system. The lateral wall point 1120 is determined by selecting a tomographic slice of a four-chamber view and then selecting the free wall. There is no specific point on the free wall that needs to be selected. In the preferred embodiment, the selected lateral wall point 1120 is well separated from the ventricular axis and the base point 1130. The lateral wall point 1120 establishes the orientation of the x and y axis.

From these three points, three basis vectors representing the direction of each axis can be calculated:

$$(\vec{x}_{vc}, \vec{y}_{vc}, \vec{z}_{vc})$$

$$M = \sqrt{(x_{apex} - x_{base})^2 + (y_{apex} - y_{base})^2 + (z_{apex} - z_{base})^2}$$

where M is the magnitude of the vector from the base point 1130 to the apex point 1110 of the cylindrical coordinate system. The Z axis basis vector can then be expressed as:

$$v_x = \frac{(x_{apex} - x_{base})}{M}$$

$$v_y = \frac{(y_{apex} - y_{base})}{M}$$

$$v_z = \frac{(z_{apex} - z_{base})}{M}$$

The vector from the base point 1130 to the lateral wall point 1120 of the cylindrical coordinate system may be expressed as:

$$\vec{n} = [(x_{lateral} - x_{base}), (y_{lateral} - y_{base}), (z_{lateral} - z_{base})]$$

It follows that the X basis vector and the Y basis vector may be expressed respectively as:

$$\vec{x}_{vc} = \frac{\vec{z}_{vc} \times \vec{n}}{|\vec{z}_{vc} \times \vec{n}|}$$

$$\vec{y}_{vc} = \frac{\vec{z}_{vc} \times \vec{x}_{vc}}{|\vec{z}_{vc} \times \vec{x}_{vc}|}$$

Data points in the sampled portion of the left ventricle of the heart are converted into the ventricular coordinate system by translating and rotating the point using the base point 1130 as the origin and the three basis vectors (Block 1030):

$$x' = x - x_{base}$$

$$y' = y - y_{base}$$

$$z' = z - z_{base}$$

$$\vec{d} = [x', y', z']$$

$$x_v = \vec{d} \cdot \vec{x}_{vc}$$

$$y_v = \vec{d} \cdot \vec{y}_{vc}$$

$$z_v = \vec{d} \cdot \vec{z}_{vc}$$

where $x_v$, $y_v$, $z_v$ are the points in the ventricular coordinate system. This transformation can also be represented in matrix form:

$$\begin{bmatrix} x_v \\ y_v \\ z_v \end{bmatrix} = \begin{bmatrix} (\vec{x}_{vc})_x & (\vec{x}_{vc})_y & (\vec{x}_{vc})_z \\ (\vec{y}_{vc})_x & (\vec{y}_{vc})_y & (\vec{y}_{vc})_z \\ (\vec{z}_{vc})_x & (\vec{z}_{vc})_y & (\vec{z}_{vc})_z \end{bmatrix} \begin{bmatrix} x - x_{base} \\ y - y_{base} \\ z - z_{base} \end{bmatrix}$$

The $(x_v, y_v, z_v)$ coordinates are transformed to a cylindrical coordinate system $(r_v, \theta_v, z_v)$ (Block 1040):

$$\theta_v = \arctan\left(\frac{y_v}{x_v}\right)$$

where the $z_v$ value does not change between the two coordinate systems. The cylindrical coordinate data $(r_v, \theta_v, z_v)$ is then converted to a 2D raster map (Block 1050).

Figure 12A:
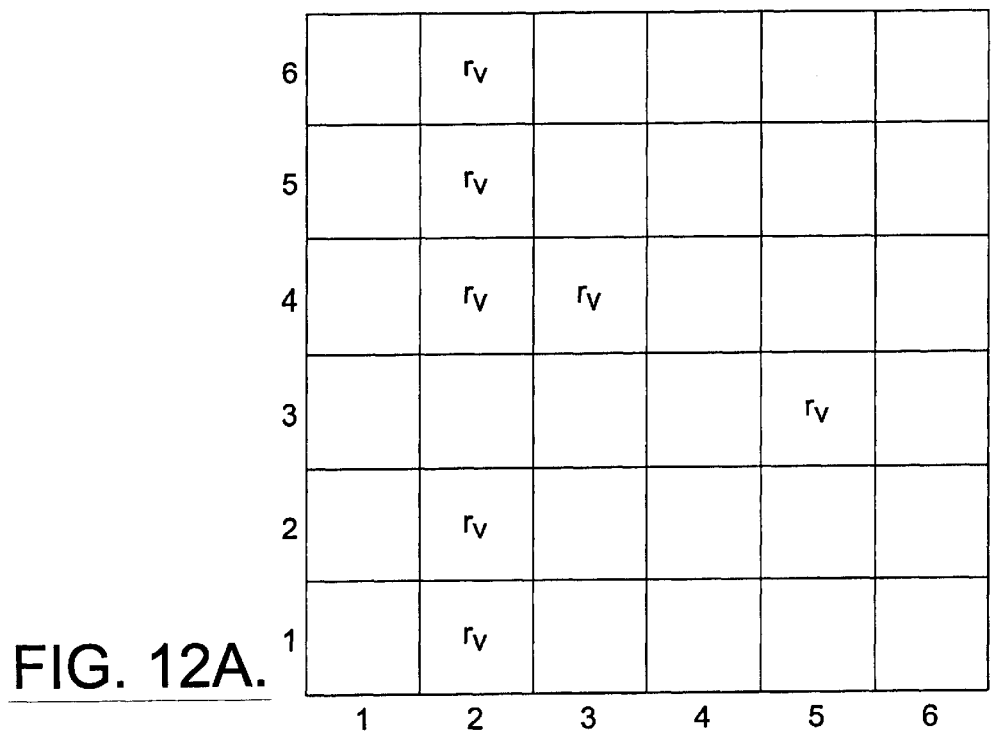
FIGS. 12A–12B illustrate a simplified raster map including known radial values $r_v$ and generated radial values $r_g$ according to the present invention.
Figure 12B:
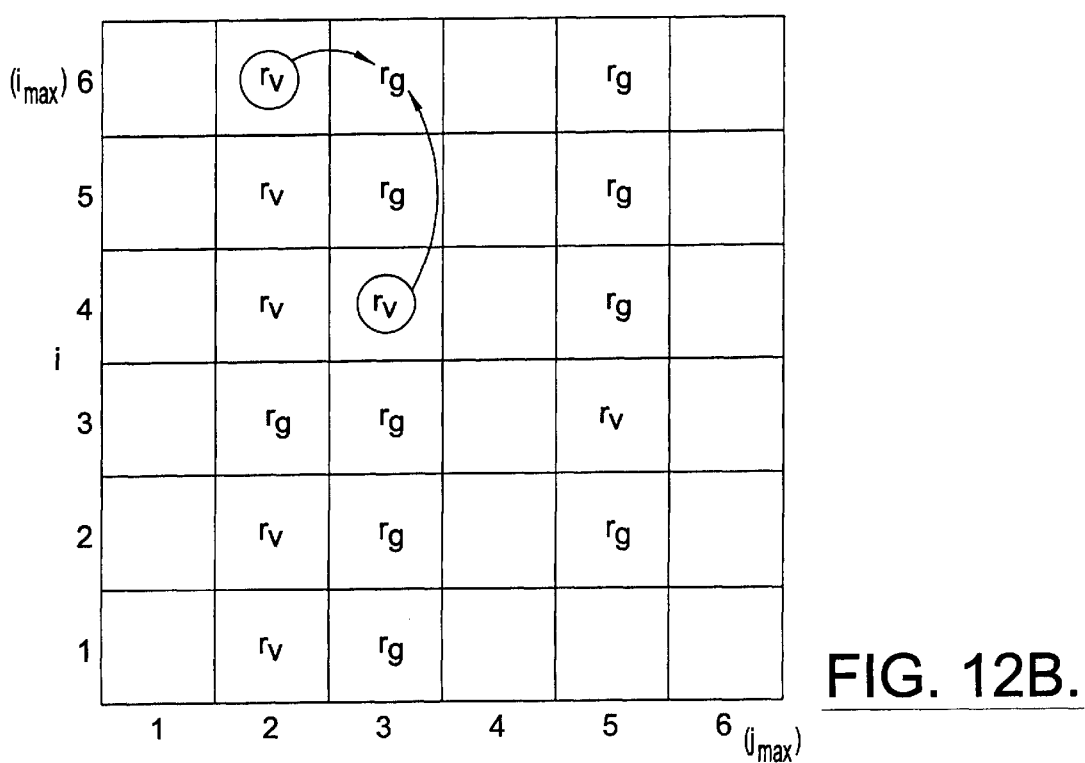

FIGS. 12A and 12B illustrate a simplified raster map including known radial values $r_v$ and generated radial values $r_g$ according to the present invention. The 2D raster map, $r_{map}(i,j)$, is a two dimensional array of values with $i_{max}$ rows and $j_{max}$ columns. According to FIG. 12A, known radial values $r_v$ are stored in the array where $i_v$ and $j_v$ index the location in the array. Locations in the raster map that have no entries correspond to the unsampled portion of the left ventricle of the heart. A particular (i,j) location that corresponds to $z_v$ and $\theta_v$, as shown in FIG. 11, is calculated in the following manner:

$$i = \frac{z_v}{M} \cdot (i_{max} - 1)$$

$$j = \frac{\theta_v}{2\pi} \cdot j_{max}$$

Both i and j are forced to be integer values and limited to range between zero and their corresponding maximum value minus one.

According to FIG. 12B, radial values, $r_g$, are generated for empty locations of FIG. 12A through extrapolation and interpolation of the data that corresponds to the sampled portion of the left ventricle (Block 1060). The extrapolation and interpolation can be calculated quickly and thereby may provide smooth linear transitions between points. In particular, an extrapolation is performed followed by 2D interpolation. In a preferred embodiment, 2D interpolation is performed as two, one dimensional (1D) interpolations.

Extrapolation is applied to points in the map where data exists in the row and column of the point. For example, the $r_g(6,3)$ may be extrapolated because $r_v(6,2)$ is present in the same row and $r_v(4,3)$ is present in the same column as $r_g(6,3)$ as shown. The value, $r_g$, is obtained using a weighted sum of the data points residing left, right, above and below the given point. In some cases all four points may not exist, but a minimum of two points will exist, under these conditions only the weights for the available points will be calculated where the distances for the non-existent points are set to one. Points that extend left and right along the row beyond 0.25 $j_{max}$ and up and down along the column beyond 0.5 $i_{max}$ are also discarded in order to restrict the effective region of a data point. The weights ($w_{left}$, $w_{right}$, $w_{up}$, $w_{down}$) are calculated by using the distances to the four data points ($d_{left}$, $d_{right}$, $d_{up}$, $d_{down}$) in the following manner:

$$w'_{left} = \frac{d_{right} \cdot d_{up} \cdot d_{down}}{d_{left}}$$

$$w'_{right} = \frac{d_{left} \cdot d_{up} \cdot d_{down}}{d_{right}}$$

$$w'_{up} = \frac{d_{left} \cdot d_{right} \cdot d_{down}}{d_{up}}$$

$$w'_{down} = \frac{d_{left} \cdot d_{right} \cdot d_{up}}{d_{down}}$$

If a weight is not within the effective region described above, it is replaced with a value of 1, which removes it from the following normalization calculations:

$$w_{total} = w'_{left} + w'_{right} + w'_{up} + w'_{down}$$

$$w_{left} = \frac{w'_{left}}{w_{total}}$$

$$w_{right} = \frac{w'_{right}}{w_{total}}$$

$$w_{up} = \frac{w'_{up}}{w_{total}}$$

$$w_{down} = \frac{w'_{down}}{w_{total}}$$

The 1D interpolations are applied first along constant j but only on columns with data points available. Then interpolation is applied along constant i to fill out the rest of the map.

The interpolation is also affected by two geometric constraints, which help define the boundary conditions. One constraint is that all values at the apex are zero. This forces the surface to close to a point at the apex. The second constraint is that the map is periodic along the j dimension, which is to say that the left edge and right edge of the map are one in the same.

Figure 13:
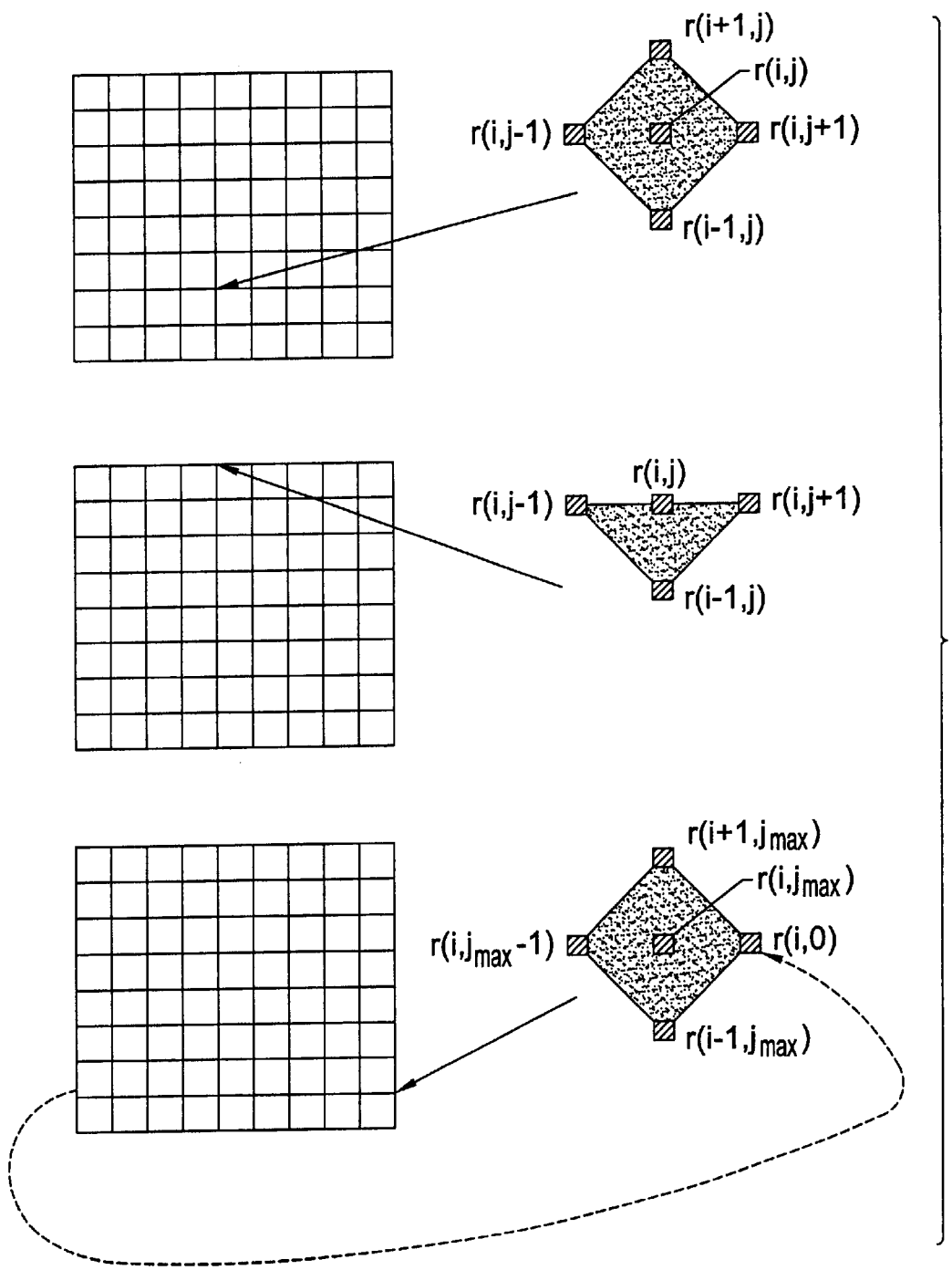
FIG. 13 illustrates interconnections of data in the raster map.

In particular, all of the data is interconnected by the formation of four triangles using points that are above, below, left and right of its position in the map as shown in FIG. 13. The exception lies at the top and bottom of the map where there are only two polygons per point. The left and right sides of the map still contain four polygons, since the map is periodic and points beyond the edge are obtained from the other side. This is inherent in the nature of the coordinate transform and is also inherent to the cylindrical surface representation used to compose the ventricular surface.

The 3D view, or ventricular surface, is generated using the data in the raster map (Block 1060). The raster map data is converted back into Cartesian coordinate data:

$$x_{i,j} = r_{map}(i, j) \cdot \cos\left(2\pi \cdot \frac{j}{j_{max}}\right)$$

$$y_{i,j} = r_{map}(i, j) \cdot \sin\left(2\pi \cdot \frac{j}{j_{max}}\right)$$

$$z_{i,j} = \frac{i}{i_{max}} \cdot M$$

A ventricular volume may be calculated based on the generated 3D view described above. The 3D view may allow a cardiologist to diagnose a heart condition related to the left ventricle more accurately and more quickly than in the prior art.

As will be appreciated by one of skill in the art, the present invention may be embodied as a method, data processing system or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including, but not limited to, hard disks, CD-ROMs, optical storage devices, magnetic storage devices, and electronic storage devices.

The present invention is also described above using a flowchart illustration. It will be understood that each block of the flowchart illustration, and combinations of blocks in the flowchart illustration, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks.

These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of generating a 3D view of a tissue surface, the method comprising the steps of:

selecting a plurality of tomographic images including the tissue surface from volumetric data to provide a plurality of selected tomographic images, each of the selected tomographic images having a different orientation with respect to the tissue surface;

accepting manual input of data defining a boundary of the tissue surface in each of the selected tomographic images to provide respective manual traces of the boundary of the tissue surface;

generating a 3D view of the tissue surface based on the manual traces of the boundary of the tissue surface; and updating the 3D view of the tissue surface as the manual input of the data defining the boundary of the tissue surface is accepted.

2. The method of claim 1, wherein the step of generating the 3D view of the tissue surface further comprises displaying a composite image including the 3D view of the tissue surface and one of the selected tomographic images including the tissue surface from the volumetric data, wherein the rendered 3D view is based on the manual traces of the boundary of the tissue surface in each of the selected tomographic images.

3. The method of claim 1, wherein the volumetric data comprises volumetric ultrasound data.

4. The method of claim 2 further comprising the steps of:

selecting a new tomographic image by traversing the rendered 3D view of the tissue surface using a sweep and a turn position;

accepting manual input of data defining a boundary of the tissue surface in the new tomographic image to provide a new manual trace thereof; and updating the 3D view of the tissue surface in real time based on the new manual traces.

5. The method of claim 1, wherein the step of selecting a plurality of tomographic images is preceded by the step of providing an approximation of the tissue surface using a predetermined geometric shape based on the volumetric data wherein the approximation of the tissue surface is modified using the manual traces.

6. The method of claim 5, wherein the tissue surface comprises a left ventricle of a heart and wherein the predetermined geometric shape comprises a cylindrical shape.

7. The method of claim 1, wherein the tissue surface comprises a left ventricle of a heart.

8. The method of claim 2, wherein the boundary of the tissue surface in the selected tomographic image is aligned with respect to the corresponding portion of the 3D view.

9. The method of claim 1 further comprising the steps of:

generating geometric data that corresponds to an unsampled portion of the tissue surface based on the manual traces of the tissue surface and a cylindrical coordinate system, wherein the 3D view is based on the geometric data that corresponds to the unsampled portion of the tissue surface and the volumetric data that corresponds to the manual traces of the tissue surface.

10. The method of claim 9, wherein the step of generating geometric data comprises the steps of:

transforming the manual traces of the tissue surface to a cylindrical coordinate system to provide respective cylindrical coordinate data; and generating a raster map that includes raster map data arranged in raster map locations of columns and rows, the generated raster map data comprising the generated geometric data and the manual traces of the tissue surface.

11. The method of claim 10, wherein the step of generating a raster map comprises the steps of:

extrapolating raster map data for unoccupied raster map locations from the sampled data, wherein raster map data exists in the rows and in the columns of the unoccupied raster map locations;

interpolating raster map data for unoccupied raster map locations in rows of the raster map, wherein raster map data exists in the column of the unoccupied raster map locations; and interpolating raster map data for remaining unoccupied raster map locations in the raster map.

12. A method of generating a tissue surface, the method comprising the steps of:

generating geometric data that corresponds to an unsampled portion of the tissue surface based on manual traces of the tissue surface and a predetermined shape that approximates the tissue surface; and generating a tissue surface based on the geometric data that corresponds to the unsampled portion of the tissue surface and the manual traces of the tissue surface by modifying the predetermined shape as the manual traces of the tissue surface are accepted.

13. The method of claim 12, wherein the volumetric data comprises volumetric ultrasound data.

14. The method of claim 12, wherein the step of generating geometric data comprises the steps of:

transforming the manual traces of the tissue surface to a coordinate system that is based on the predetermined shape to provide respective geometric coordinate data; and generating a raster map that includes raster map data arranged in raster map locations of columns and rows, the generated raster map data comprising the generated geometric data and the manual traces of the tissue surface.

15. The method of claim 14, wherein the step of generating a raster map comprises the steps of:

extrapolating raster map data for unoccupied raster map locations from the manual traces sampled data, wherein raster map data exists in the rows and in the columns of the unoccupied raster map locations;

interpolating raster map data for unoccupied raster map locations in the rows of the raster map, wherein raster map data exists in the columns of the unoccupied raster map locations; and interpolating raster map data for remaining unoccupied raster map locations in the raster map.

16. The method of claim 12, further comprising the steps of:

selecting a plurality of 2D tomographic images including the tissue surface from volumetric data to provide a plurality of selected tomographic images, each of the selected tomographic images having a different orientation with respect to the tissue surface;

accepting manual input of data defining a boundary of the tissue surface in each of the selected tomographic images to provide respective manual traces of the boundary of the tissue surface; and generating a 3D view of the tissue surface based on the manual traces of the boundary of the tissue surface.

17. The method of claim 16, wherein the step of displaying a 3D view of the tissue surface further comprises displaying a composite image including the 3D view of the tissue surface and one of the selected tomographic images including the tissue surface from the volumetric data, wherein the 3D view is based on the manual traces of the boundary of the tissue surface in each of the selected tomographic images.

18. A method according to claim 12, wherein the predetermined shape comprises a predetermined 3D shape.

19. A computer program product for generating an image of a tissue surface comprising a computer-readable storage medium having computer-readable program code means embodied in said medium, said computer-readable program code means comprising:

computer-readable program code means for selecting a plurality of tomographic images including the tissue surface from volumetric data to provide a plurality of selected tomographic images, each of the selected tomographic images having a different orientation with respect to the tissue surface;

computer-readable program code means for accepting manual input of data defining a boundary of the tissue surface in each of the selected tomographic images to provide respective manual traces of the boundary of the tissue surface;

computer-readable program code means for generating a 3D view of the tissue surface based on the manual traces of the boundary of the tissue surface; and computer-readable program code means for updating the 3D view of the tissue surface as the manual input of the data defining the boundary of the tissue surface is accepted.

20. The computer program product of claim 19, wherein the computer-readable program code means for generating the 3D view of the tissue surface further comprises computer-readable program code means for displaying a composite image including the 3D view of the tissue surface and one of the selected tomographic images including the tissue surface from the volumetric data, wherein the 3D view is based on the manual traces of the boundary of the tissue surface in each of the selected tomographic images.

21. The computer program product of claim 19, wherein the volumetric data comprises volumetric ultrasound data.

22. The computer program product of claim 20 further comprising:

computer-readable program code means for selecting a new tomographic image by traversing the 3D view of the tissue surface using a sweep and a turn position;

computer-readable program code means for accepting manual input of data defining a boundary of the tissue surface in the new tomographic image to provide a new manual trace thereof; and computer-readable program code means for updating the 3D view of the tissue surface in real time based on the new manual traces.

23. The computer program product of claim 19, wherein the computer-readable program code means for selecting a plurality of tomographic images further comprises computer-readable program code means for providing an approximation of the tissue surface using a predetermined geometric shape based on the volumetric data wherein the approximation of the tissue surface is modified using the manual traces.

24. The computer program product of claim 22, wherein the tissue surface comprises a left ventricle of a heart.

25. The computer program product of claim 19, wherein the boundary of the tissue surface in the selected tomographic image is aligned with respect to the corresponding portion of the 3D view.

26. The computer program product of claim 20, wherein the computer-readable program code means for displaying a 3D view comprises computer-readable program code means for displaying the selected tomographic image embedded in the rendered 3D view according to the orientation of the tomographic image in the volumetric data.

27. The computer program product of claim 19 further comprising:

computer-readable program code means for generating geometric data that corresponds to an unsampled portion of the tissue surface based on the manual traces of the tissue surface and a cylindrical coordinate system, wherein the 3D view is based on the geometric data that corresponds to the unsampled portion of the tissue surface and the volumetric data that corresponds to the sampled portion of the manual traces of the tissue surface.

28. The computer program product of claim 27, wherein the computer-readable program code means for generating geometric data comprises:

computer-readable program code means for transforming the manual traces of the tissue surface to a cylindrical coordinate system to provide respective cylindrical coordinate data; and computer-readable program code means for generating a raster map that includes raster map data arranged in raster map locations of columns and rows, the generated raster map data comprising the generated geometric data and the manual traces of the tissue surface.

29. The computer program product of claim 28, wherein the computer-readable program code means for generating a raster map comprises:

computer-readable program code means for extrapolating raster map data for unoccupied raster map locations from the manual traces of the tissue surface, wherein raster map data exists in the rows and in the columns of the unoccupied raster map locations;

computer-readable program code means for interpolating raster map data for unoccupied raster map locations in the rows of the raster map, wherein raster map data exists in the columns of the unoccupied raster map locations; and computer-readable program code means for interpolating raster map data for unoccupied raster map locations in the raster map.

30. A computer program product for generating a tissue surface data comprising computer-readable program code means for a computer-readable storage medium having computer-readable program code means embodied in said medium, said computer-readable program code means comprising:

computer-readable program code means for generating geometric data that corresponds to an unsampled portion of the tissue surface based on manual traces of the tissue surface and a predetermined shape that approximates the tissue surface; and computer-readable program code means for generating a tissue surface based on the geometric data that corresponds to the unsampled portion of the tissue surface and the manual traces of the tissue surface by modifying the predetermined shape as the manual traces of the tissue surface are accepted.

31. The computer program product of claim 30, wherein the volumetric data comprises volumetric ultrasound data.

32. The computer program product of claim 30, wherein the computer-readable program code means for generating geometric data comprises:

computer-readable program code means for transforming the manual traces of the tissue surface to a coordinate system that is based on the predetermined shape to provide respective geometric coordinate data; and computer-readable program code means for generating a raster map that includes raster map data arranged in raster map locations of columns and rows, the generated raster map data comprising the generated geometric data and the manual traces of the tissue surface.

33. The computer program product of claim 32, wherein the computer-readable program code means for generating a raster map comprises:

computer-readable program code means for extrapolating raster map data for unoccupied raster map locations from the manual traces of the tissue surface, wherein raster map data exists in the rows and in the columns of the unoccupied raster map locations;

computer-readable program code means for interpolating raster map data for unoccupied raster map locations in the rows of the raster map, wherein raster map data exists in the columns of the unoccupied raster map locations; and computer-readable program code means for interpolating raster map data for remaining unoccupied raster map locations in the raster map.

34. The computer program product of claim 30, further comprising:

computer-readable program code means for selecting a plurality of tomographic images including the tissue surface from volumetric data to provide a plurality of selected tomographic images, each of the selected tomographic images having a different orientation with respect to the tissue surface;

computer-readable program code means for accepting manual input of data defining a boundary of the tissue surface in each of the selected tomographic images to provide respective manual traces of the boundary of the tissue surface; and computer-readable program code means for generating a 3D view of the tissue surface based on the manual traces of the boundary of the tissue surface.

35. The computer program product of claim 34, wherein the computer-readable program code means for displaying a 3D view of the tissue surface further comprises computer-readable program code means for displaying a composite image including the 3D view of the tissue surface and one of the selected tomographic images including the tissue surface from the volumetric data, wherein the 3D view is based on the manual traces of the boundary of the tissue surface in each of the selected tomographic images.

36. A volumetric processing system that provides volumetric data corresponding to scanned tissue surfaces, the volumetric processing system comprising:

a processor that selects a plurality of tomographic images including the tissue surface from volumetric data to provide a plurality of selected tomographic images, each of the selected tomographic images having a respective orientation with respect to the tissue surface, wherein the processor accepts manual input of data defining a boundary of the tissue surface in each of the selected tomographic images to provide respective manual traces of the boundary of the tissue surface, and wherein the processor generates a 3D view of the tissue surface based on the manual traces of the boundary of the tissue surface and updates the 3D view of the tissue surface as the manual input of the data defining the boundary of the tissue surface is accepted.

37. The system of claim 36, wherein the processor displays a composite image including a rendered 3D view of the tissue surface and at least one of the plurality of selected tomographic images including the tissue surface from the volumetric data, wherein the rendered 3D view is based on the manual traces of the boundary of the tissue surface in each of the selected tomographic images.

38. The system of claim 36, wherein the processor selects a new tomographic image by traversing the rendered 3D view of the tissue surface using a sweep and a turn position, and accepts manual input data defining a boundary of the tissue surface in the new tomographic image to provide a manual trace thereof, and updates the rendered 3D view of the tissue surface in real time based on the manual traces of the boundary of the tissue surface including the manual trace of the boundary of the tissue surface in new tomographic image.

39. The system of claim 36, wherein the processor provides an approximation of the tissue surface using a predetermined geometric shape based on the volumetric data wherein the approximation of the tissue surface is modified using the manual traces.

40. The system of claim 38, wherein the processor provides an approximation of the tissue surface using a cylindrical shape, wherein the tissue surface comprises a left ventricle of a heart.

41. The system of claim 38, wherein the processor displays the selected tomographic image embedded in the rendered 3D view according to the orientation of the tomographic image in the volumetric data.

42. The system of claim 38, wherein the processor generates geometric data that corresponds to an unsampled portion of the tissue surface based on volumetric data that corresponds to a sampled portion of the tissue surface and a cylindrical coordinate system; and generates tissue surface data based on the geometric data that corresponds to the unsampled portion of the tissue surface and the volumetric data that corresponds to the sampled portion of the tissue surface.

43. The system of claim 42, wherein the processor transforms the volumetric data that corresponds to the sampled portion of the tissue surface to a cylindrical coordinate system to provide respective cylindrical coordinate data and generates a raster map that includes raster map data arranged in raster map locations of columns and rows of the cylindrical coordinate system, the generated raster map data comprising the generated geometric data and the volumetric data that corresponds to the sampled portion of the tissue surface.

44. The system of claim 43, wherein the processor extrapolates raster map data for unoccupied raster map locations, wherein volumetric data that corresponds to the sampled portion of the tissue surface exists in the rows and in the columns of the unoccupied raster map locations, and interpolates raster map data for unoccupied raster map locations in rows of the raster map, wherein raster map data exists in the column of the unoccupied raster map locations, and interpolates raster map data for remaining unoccupied raster map locations in the raster map.

45. The system of claim 43 further comprising:

a screen, responsive to the volumetric processor, that displays the 3D view of the tissue surface provided by the volumetric processor;

an input device, responsive to the volumetric processor, that provides manual trace input data corresponding to the boundary of the tissue surface in the plurality of tomographic images; and a data collection device that provides volumetric data to the volumetric processor.

46. The system of claim 45, wherein the data collection device comprises a storage medium.

47. A method of generating a 3D view of a tissue surface, the method comprising:

selecting a first tomographic image from volumetric data;

accepting first manual input to define a first boundary of the tissue surface in the first tomographic image;

displaying a 3D view of the tissue surface based on the first boundary;

selecting a second tomographic image from the volumetric data by traversing through the displayed 3D view;

accepting second manual input to define a second boundary of the tissue surface in the second tomographic image; and updating the display of the 3D view based on the second boundary as the second manual input is accepted.

48. A method according to claim 47, wherein the act of updating the display of the 3D view comprises deforming a predetermined geometric shape that represents the tissue surface as the second manual input is accepted.

49. A method according to claim 47, wherein the act of selecting a second tomographic image comprises traversing through the displayed 3D view using a sweep position and a turn position in the volumetric data.

* * * * *

UNITED STATES PATENT AND TRADEMARK OFFICE
CERTIFICATE OF CORRECTION

PATENT NO. : 6,545,678 B1
DATED : April 8, 2003
INVENTOR(S) : Chikai J. Ohazama

It is certified that error appears in the above-identified patent and that said Letters Patent is hereby corrected as shown below:

<u>Column 15,</u>
Line 16, should read as follows:
-- 24. The computer program product of claim 23, wherein --

Signed and Sealed this

Ninth Day of September, 2003

JAMES E. ROGAN
*Director of the United States Patent and Trademark Office*